United States Patent [19]
van Driest et al.

[11] Patent Number: 5,128,960
[45] Date of Patent: Jul. 7, 1992

[54] CLOCK RECOVERY FOR A WIRELESS LOCAL AREA NETWORK STATION

[75] Inventors: Hans van Driest, Bilthoven; Jan Boer, Odijk, both of Netherlands

[73] Assignee: NCR Corporation, Dayton, Ohio

[21] Appl. No.: 633,697

[22] Filed: Dec. 24, 1990

[30] Foreign Application Priority Data

Sep. 6, 1990 [GB] United Kingdom ............... 9019491

[51] Int. Cl.⁵ .................................... H04K 1/00
[52] U.S. Cl. .................................... 375/1; 380/34; 380/48; 375/107
[58] Field of Search .................... 370/18, 20, 60.1; 375/1, 38, 39, 107, 108, 10, 118; 455/59, 60, 61; 380/31, 33, 34, 40, 48

[56] References Cited

U.S. PATENT DOCUMENTS

| | | | |
|---|---|---|---|
| 4,995,052 | 2/1991 | Thorvaldsen | 375/1 |
| 5,031,191 | 7/1991 | Hiramatsu et al. | 375/1 |
| 5,038,362 | 8/1991 | Takeuchi et al. | 375/1 |

FOREIGN PATENT DOCUMENTS

| | | |
|---|---|---|
| 0316459 | 11/1987 | European Pat. Off. |
| 0306941 | 9/1988 | European Pat. Off. |
| 0316876 | 11/1988 | European Pat. Off. |
| 0334239 | 3/1989 | European Pat. Off. |
| 2203303 | 10/1988 | United Kingdom ............ 375/1 |

OTHER PUBLICATIONS

Moshem Kavehrad and George E. Bodeep, "Design and Experimental Results for a Direct-Sequence Spread-Spectrum Radio Using Differential Phase-Shift Keying Modulation for Indoor, Wireless Communications", IEEE Journal on Selected Areas In Communications, vol. SAC-5 (Jun. 1987), pp. 815-823.

*Primary Examiner*—Tod Swann
*Attorney, Agent, or Firm*—Elmer Wargo

[57] ABSTRACT

A local area network station for receiving data symbols encoded in a spread spectrum code and transmitted over a wireless channel includes in-phase and quadrature correlators (42, 44) the output signals of which are used to address a look-up table (50) for conversion to amplitude and phase sample signals. Corresponding amplitude sample signals are integrated and stored in a plurality of registers (96) and for each symbol, the register (96) storing the maximum value is ascertained to identify the associated sample number, which is stored in a sample number register (160). This sample number is utilized to determine the time of a symbol clock signal (RXCLK) used for clocking the received data.

10 Claims, 5 Drawing Sheets

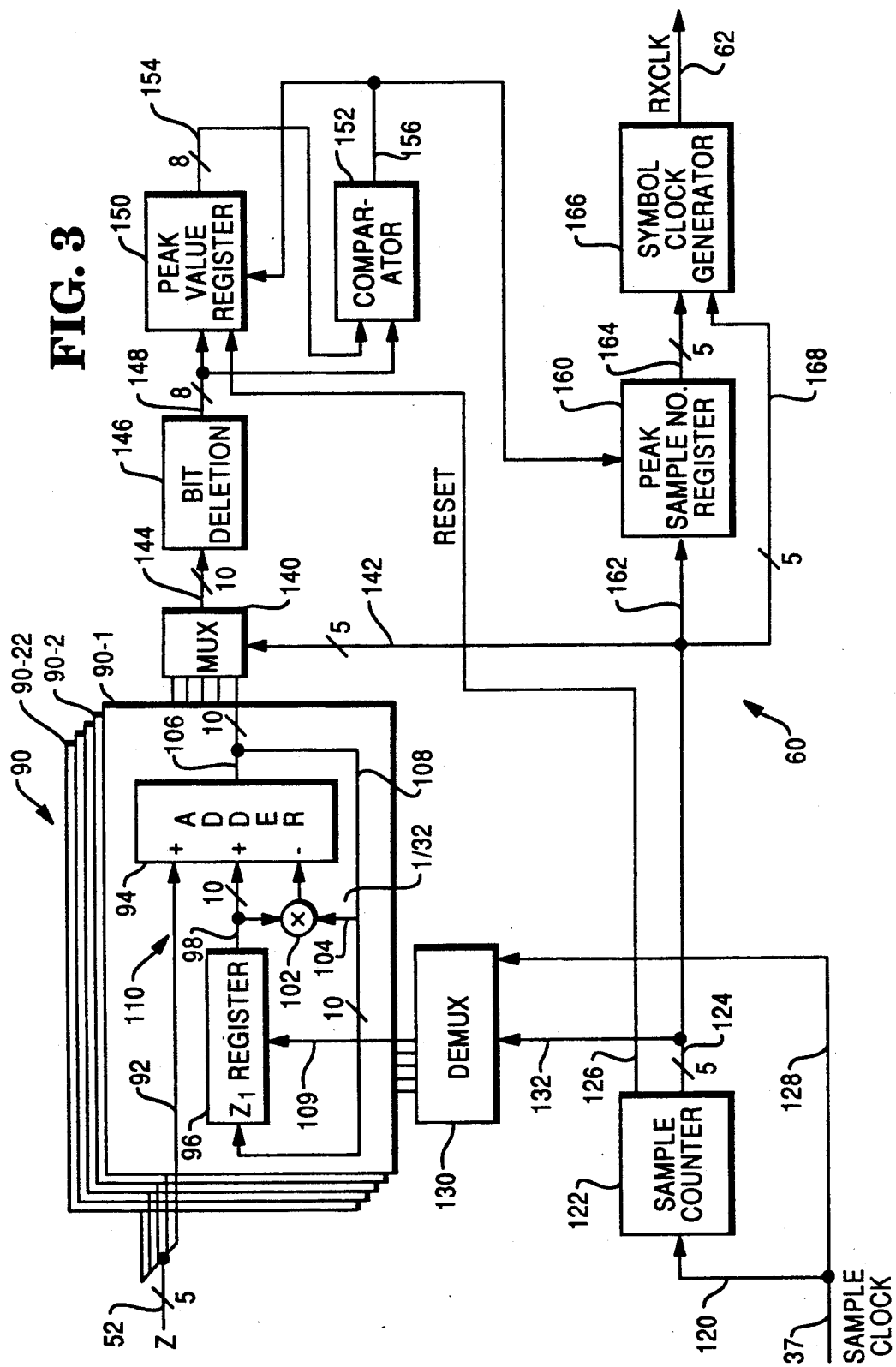

CLOCK RECOVERY FOR A WIRELESS LOCAL AREA NETWORK STATION

BACKGROUND OF THE INVENTION

This invention relates to local area networks (LANs).

Local area networks (LANs) wherein a plurality of network stations are interconnected by cabling have become widely known and utilized. However, LANs using wired connections have the disadvantage that extensive cabling is required to interconnect the stations. The provision of such cabling is generally inconvenient, and gives rise to inflexibility if it is desired to alter the physical location of the stations. It has been proposed to utilize a wireless link for LANs. This has the additional advantage that mobile stations can be utilized. However, certain problems are associated with the use of a wireless transmission link, particularly for LANs in an indoor environment. One such problem is multipath fading. The use of spread spectrum communication techniques alleviates the problems associated with multipath fading. Another problem associated with wireless LANs is that of providing a correctly timed receiver clock, suitable for use in timing the received data in the presence of various disturbance effects to which wireless LANs ar subject. For example, where a plurality of wireless LANs are disposed in proximity to one another, the signals transmitted in one wireless LAN may be received by a station in another wireless LAN, thereby causing timing problems in that station.

SUMMARY OF THE INVENTION

It is an object of the present invention to provide a local area network station, suitable for use in a wireless LAN, which provides a recovered clock signal in which interference effects are minimized.

Therefore, according to the present invention, there is provided a local area network station for receiving data symbols encoded in a spread spectrum code and transmitted over a wireless channel, characterized by analog-to-digital conversion means adapted to provide a digital representation of a received signal, correlator means coupled to said analog-to-digital conversion means and adapted to provide a plurality of signal samples, integrator and storage register means including a plurality of storage registers adapted to store integrated representations of said signal samples, peak determining means adapted to determine the maximum value stored in said storage registers, and clock generating means adapted to provide recovered clock signals at times corresponding to samples providing said maximum value.

Another aspect of this invention relates to a method of recovering clock signals from a data symbol encoded in a spread spectrum code and transmitted over a wireless channel, including the steps of:
 (a) converting the received signal to a digital representation;
 (b) correlating said digital representation to provide a plurality of signal samples;
 (c) integrating said signal samples;
 (d) determining the maximum value of the integrated samples; and
 (e) providing recovered clock signals at times corresponding to samples providing said maximum value.

A further advantage of the invention is, in an environment where more than one antenna is transmitting the same information, a mobile station will switch from one source antenna to another source antenna in accordance with station movement.

A preferred embodiment of the present invention will now be described by way of example, with reference to the following description, claims, and accompanying drawing.

BRIEF DESCRIPTION OF THE DRAWING

FIG. 3 is a block diagram of a clock recovery circuit included in the circuit shown in FIG. 2.

DETAILED DESCRIPTION OF THE INVENTION

Figure 1:
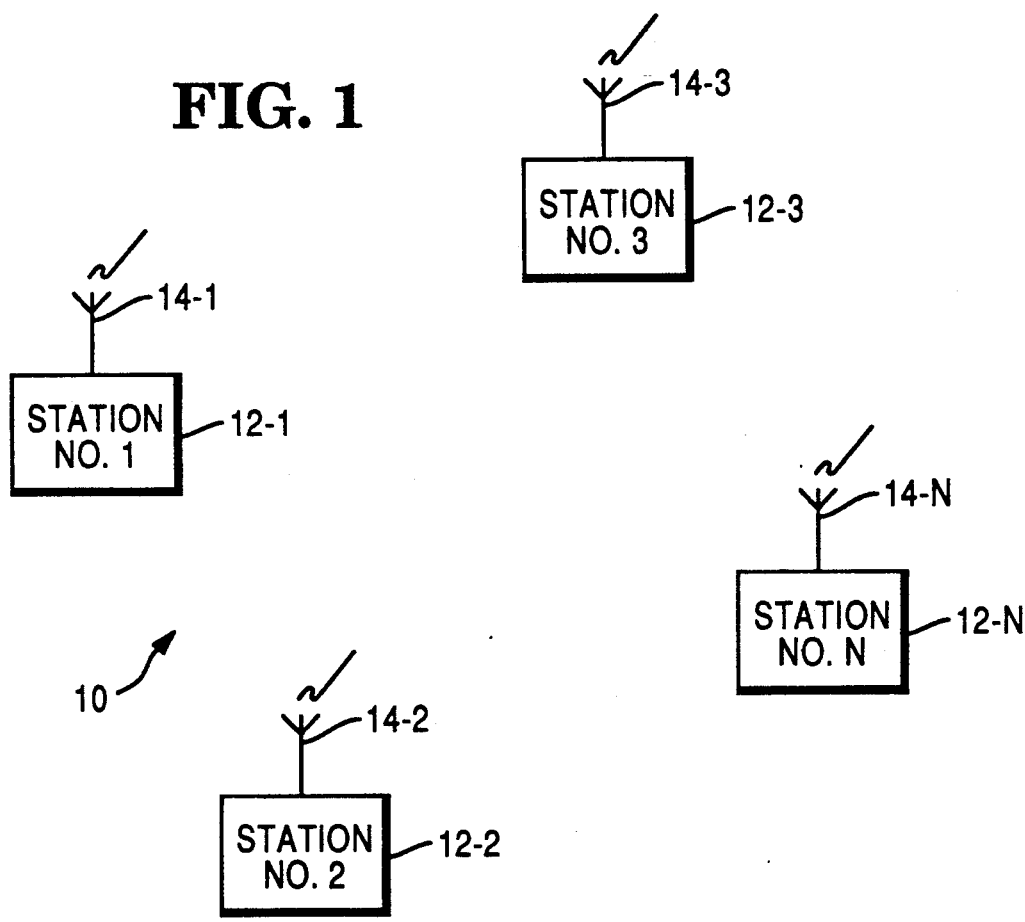
FIG. 1 is a diagram of a radio LAN.

Referring first to FIG. 1, there is shown a radio local area network (radio LAN) 10 including a plurality N of stations 12, shown individually as 12-1 to 12-N. Each station has an antenna 14, shown individually as 14-1 to 14-N. Although not shown in FIG. 1, it should be understood that a distribution system (relay unit) may be provided having two or more antennas in order to increase the coverage area for the radio LAN 10.

Communication among the stations 12 takes place on a single radio channel, and uses spread spectrum communication technology. In the indoor radio LAN of the preferred embodiment, the 902–928 MHz band is utilized. Another suitable frequency band lies around 2.5 GHz. In the preferred embodiment, information is transmitted using an 11-chip spread spectrum code based on quadrature modulation with two bits per symbol and 4 DPSK (four phase differential phase shift keying) coding. However, spread spectrum codes having different numbers of chips and other types of modulation could be utilized.

Figure 2A:
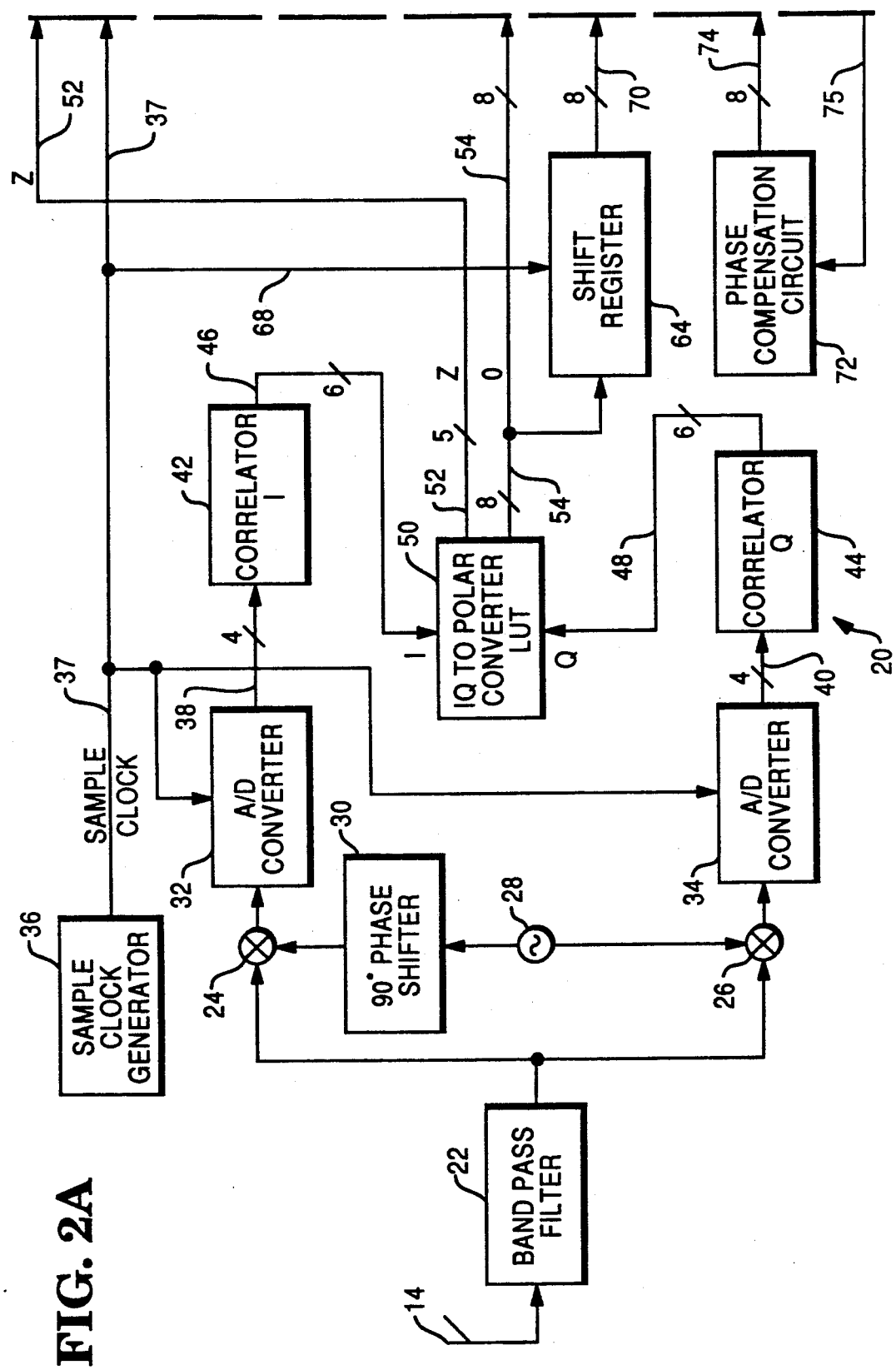
FIG. 2a and 2b are block diagrams of a portion of a receiver included in a LAN station.
Figure 2B:
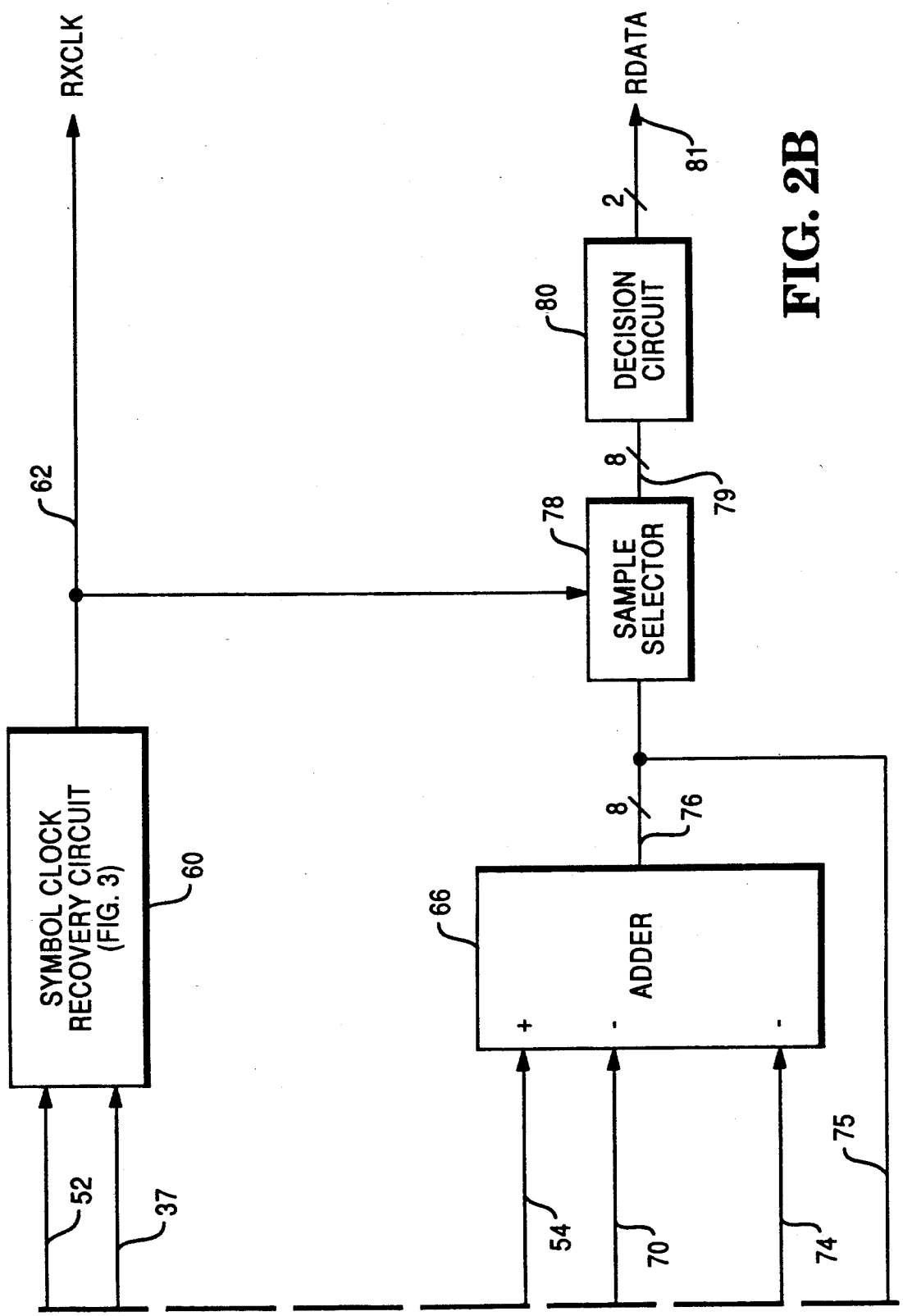

Referring now to FIG. 2, there is shown a data and clock recovery circuit 20 included in each station 12. The signal received by the antenna 14 is fed to a band pass filter 22 the output of which is applied to mixers 24 and 26. A local oscillator 28 is coupled directly to the mixer 26 and via a 90 degrees phase shifter 30 to the mixer 24. The mixers 24 and 26 provide in-phase and quadrature signal components, corresponding to signals in the I plane and Q plane, respectively.

The outputs of the mixers 24 and 26 are applied to analog-to-digital converters 32 and 34 respectively. The analog-to-digital converters 32 and 34 are also supplied with sample clock pulses provided on a sample clock line 37 by a sample clock generator circuit 36 which generates clock signals at twice the chip rate of the spread spectrum. In the preferred embodiment, the sample clock generator circuit operates at 22 MHz. Thus, for the 11-chip code utilized in the preferred embodiment, 22 sample clock pulses are generated by the sample clock generator 36 for each data symbol. However, other sampling rates are possible, such as sampling at the chip rate itself, or at multiples thereof other than two.

The outputs of the analog-to-digital converters 32 and 34 are applied over 4-bit lines 38 and 40 to respective digital correlators 42 and 44, which provide digital ouput signals on respective 6-bit lines 46 and 48, which are coupled to an IQ to polar converter 50 which is formed by a look-up table (LUT). It should be understood that the short oblique lines crossing certain leads in the figures indicate the number of conductors in the associated leads. The converter 50 is operative to convert the in-phase/quadrature signal representation IQ to an amplitude/phase representation Z,0 of the vector of the correlated signal, on output lines 52 and 54 respectively.

The line 52 is connected to a symbol clock recovery circuit 60 which provides a recovered symbol clock signal (RXCLK) on an output line 62. The line 54 is connected to a shift register 64 and to an additive input of an adder 66. The shift register 64 provides a 22 sample delay under the control of the sample clock applied to the shift register 64 over a line 68. The output of the shift register 64 is coupled over an 8-bit line 70 to a subtractive input of the adder 66. It will be appreciated that the shift register 64 provides a delay of one symbol time period between its input and its output.

A phase compensation circuit 72 has an output connected over an 8-bit line 74 to a subtractive input of the adder 66, and an input connected over a feedback line 75 to the 8-bit output line 76 of the adder 66. The phase compensation circuit 72 is adjusted during the preamble time of a received data frame, and includes a register which stores an adjusted compensation value to correct the phase of the received signal. Thus, the adder 66 provides, on its 8-bit output line 76, values representing the compensated difference between the current phase sample and the one symbol delayed phase sample, that is, the absolute phase sample, since, as mentioned, a differential phase encoding is utilized. The line 76 is connected to a sample selector circuit 78 to which is applied the RXCLK signal on the line 62, thereby selecting one out of 22 phase signal values when the clock signal RXCLK is active. The thereby selected phase signal value is applied to a decision circuit 80 to provide the output data signal RDATA on a line 81 in accordance with the quadrative modulation coding scheme employed.

Referring now to FIG. 3, there is shown a block diagram of the symbol clock recovery circuit 60 (FIG. 2). The 5-bit input line 52 is connected in parallel to 22 integrator-register circuit modules 90, referenced individually as 90-1 to 90-22. The integrator-register circuit modules 90 have identical construction, and only the circuit module 90-1 will be described. The input line 92, connected to the line 52, is applied to an additive input of an adder 94. A register 96, which, in the circuit module 90-1 stores the value $Z_1$, has a 10-bit output line 98 coupled to a further additive input of the adder 94. The line 98 is also coupled to an input of a multiplier 102 which also receives an input 104 to which the constant value 1/32 is applied. The output of the multiplier 102 is coupled to a subtractive input of the adder 94. The 10-bit output line 106 of the adder 94 is coupled via a feedback line 108 to an input of the register 96. The register 96 is enabled by a signal on a line 109. It will be appreciated that the adder 94, multiplier 102 and associated circuitry constitute a leaky integrator circuit, referenced generally as 110.

The sample clock input line 37 (FIG. 3) is connected over a line 120 to a free-running sample counter 122 which counts repetitively from value 0 to value 21 and provides a 5-bit output count on an output line 124 representing the current sample number (0-21), and a further output signal on a line 126 when the count value passes from 21 to 0. The input line 37 is also connected via a line 128 to a demultiplexer 130 which receives the sample output count on the line 124 over a line 132. It will be appreciated that the demultiplexer 130 sequentially applies enabling signals to the registers 96 of the circuit modules 90-1 to 90-22, including an enabling signal over the line 109 to the register 96 in the first circuit module 90-1.

The 10-bit output line 106 of the adder 94 (FIG. 3) is connected as one input of a 22-input multiplexer 140 which receives corresponding inputs from the other circuit modules 90-2 to 90-22. The multiplexer 140 has a 5-bit select input line 142 coupled to the sample counter output line 124, and a 10-bit output line 144 coupled to a bit deletion circuit 146 which deletes the two least significant bits to provide an 8-bit output on a line 148. The output line 148 is connected to a peak value register 150 and to one input of a comparator 152. The 8-bit output line 154 is connected to a second input of the comparator 152. The output of the comparator 152 is connected over a line 156 to a set input of the register 150. A reset input of the register 150 is connected to the line 126.

The output line 156 of the comparator 152 (FIG. 3) is also connected to a set input of a peak sample number register 160, which has an input connected via a line 162 to the count output line 124 of the sample counter 122. The 5-bit output line 164, which represents the sample number of the peak value in a symbol is coupled to a symbol clock generator circuit 166, which has a further input connected via a 5-bit line 168 to the sample counter output line 124. The symbol clock generator circuit 166 is a logic circuit which generates an output symbol clock pulse RXCLK on the line 62 at a time corresponding to the sample number stored in the register 160.

The symbol clock recovery circuit 60, FIG. 3, operates in the following manner. For each sample applied over the 5-bit input line 52, a value, calculated by the leaky integrator circuit 110, is stored in the corresponding register 96 of the relevant circuit module 90. This value is the sum of the previously stored value and the newly applied value, with 1/32 of the previous value subtracted. Thus, each sample position within a symbol is separately integrated with the corresponding previous sample position. As a result, the contents of the 22 registers 96 represent these integrated values. The peak (maximum) of these values is ascertained by the peak value register 150 and the comparator 152 in the following manner. The peak value register 150 is cleared (reset) via the line 126 when the sample counter 122 steps from a count of 21 to a count of 0. The comparator 152 successively compares the contents of the multiplexer 140. Each time the latter value is higher than the former the comparator 152 provides an output signal on the line 156 to cause the register 150 to store the multiplexer output (with the two least significant bits deleted). The signal on the line 156 also causes the peak sample number register 160 to store the corresponding peak sample number. Thus, at the end of a complete cycle of the sample counter 122, corresponding to one symbol period, the peak sample number register 160 contains the sample number at which the highest value of the 22 samples were found. This value, applied to the symbol clock generator logic circuit 166, results in the provision of the symbol clock signal RXCLK on the line 62 at a time corresponding to the largest sample value.

In a modification of the symbol clock recovery circuit shown in FIG. 3, a single leaky integrator circuit can be used, instead of the 22 integrator circuits 94 contained in the 22 circuit modules 90, by utilizing a cycling RAM or a delay line having 22 series-connected one-sample delays, and coupling the single leaky integrator circuit to the RAM or delay line. In this modification, the multiplexer 140 and demultiplexer 130 are of course unnecessary and therefore omitted from the circuit.

A very fast identification of the desired peak is achieved by the described circuitry, for example, within about four symbol times. A further advantage is that the effect of noise is minimized, so that high stability is achieved.

The radio LAN 10, FIG. 1, does not operate over an ideal radio channel, but involves multipath characteristics, particularly in an indoor environment. Thus, a signal received at an antenna 14 will be a sum of analog signals which have travelled over paths of different lengths. Some paths cancel out, whereas others add to produce increased amplitude. This phenomenon is known as multipath.

Figure 4A:
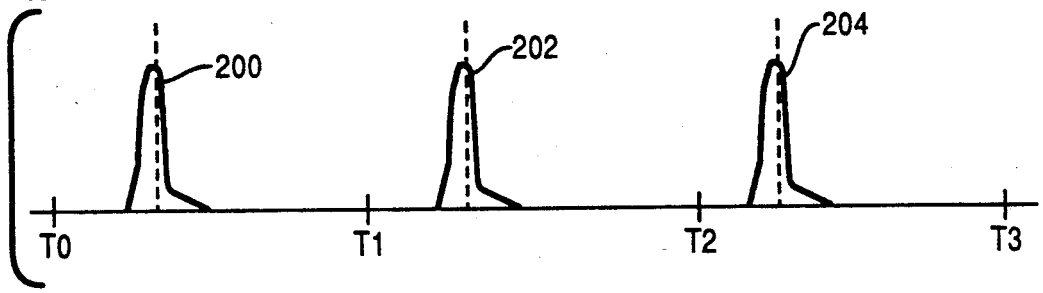
FIGS. 4A to 4D are waveform diagrams of correlater output signals, helpful in understanding the operation of the present invention.
Figure 4B:
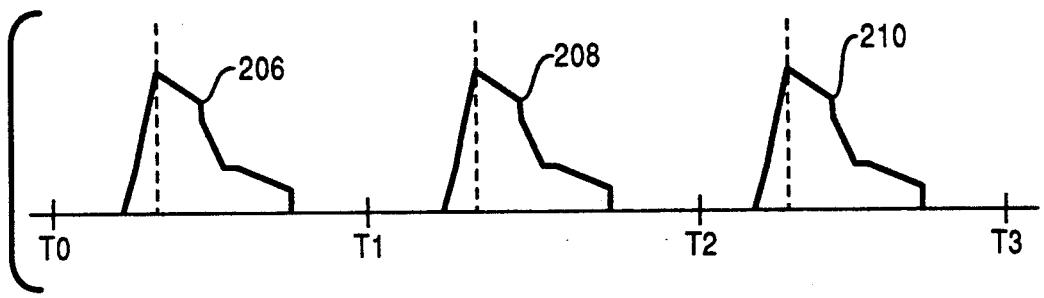
Figure 4C:
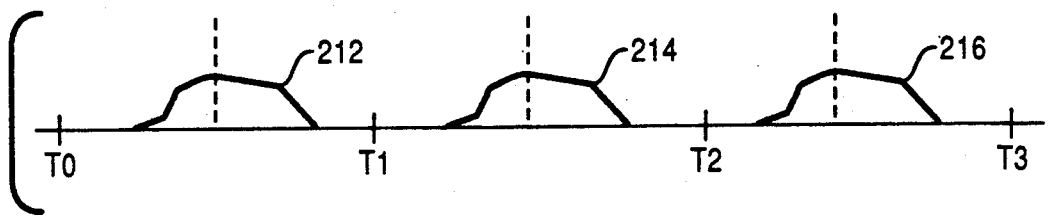

Referring to FIGS. 4A to 4D, there are shown typical correlator output amplitude signals, after conversion to amplitude/phase representation Z, O, for three successive symbol periods identified by time intervals T0 to T1, T1 to T2, and T2 to T3. FIG. 4A shows three correlator output signals 200, 202, and 204 which would be developed for a radio channel with minimal multipath. FIG. 4B shows three correlator output signals 206, 208, and 210 which would be developed for a radio channel with high multipath but with a line-of-sight channel between transmitter and receiver. FIG. 4C shows three correlator output signals which would be developed for a radio channel with intermediate multipath but with an obstruction in the line-of-sight path between the transmitter and the receiver. For each of the signals shown in FIGS. 4A, 4B and 4C peaks occur at sample times represented by the vertical dashed lines. These sample times are suitable for providing the symbol clock signal RXCLK, in the manner described above.

Figure 4D:
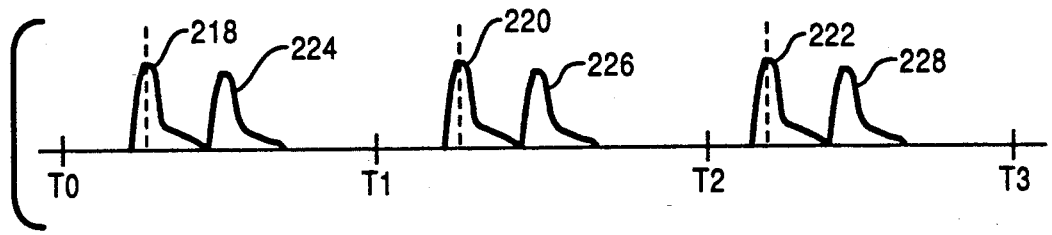

Referring to FIG. 4D, there are shown correlator output signals which would be provided where signals from two transmitters are received. Thus the signals 218, 220, and 222 derive from a first transmitter, and the signals 224, 226, and 228 derive from a second transmitter. The clock recovery circuitry described herein with reference to FIGS. 2 and 3 will provide a recovered symbol clock signal RXCLK at times represented by the vertical dashed lines for the signals 218, 220 and 222 from the first transmitter. Thus, data from the first transmitter will be recovered, and data from the second transmitter will be ignored. This is advantageous as compared with clock recovery using a phase locked loop, since such loop would tend to synchronize to a time instant midway between the peaks such as 218 and 224, at which time instant there is no information signal present. Thus the clock recovery circuit described herein will remain synchronized with the stronger received signal, even though a slightly weaker signal is being received at a short time interval from the strong signal. Thus, the undesired reception of transmissions from foreign LANs which may be located close to the LAN 10, FIG. 1, is minimized.

Another advantage of the described clock recovery circuit is that a mobile station 12 will always synchronize to the strongest detected signal, so that in a LAN having a distribution system where multiple transmission antennas are employed, the mobile station will continue to synchronize with the transmission of another antenna, if the transmission from a given antenna is lost, due to a temporary blockage of a transmission path. Also, the clock recovery circuit will remain synchronized to a signal, even if the channel characteristic is not constant, due for example to moving objects in the transmission path.

Although the preferred embodiment has been described as utilizing radio frequency transmissions, that is, frequencies in the range 10 KHz to 3000 GHz, it will be appreciated that frequencies greater than 3000 GHz, such as infrared frequencies, can be employed.

To summarize this invention in claim-like language, it relates to a local area network station for receiving data symbols encoded in a spread spectrum code and transmitted over a wireless channel comprising;

analog-to-digital conversion means (32, 34) to provide a digital representation of a received signal;

correlator means (42, 44, 50) coupled to said analog-to-digital conversion means (32, 34), to provide a plurality of signal samples;

integrator and storage register means (90) including a plurality of storage registers (96) to store integrated representations of said signal samples;

peak determining means (150, 152, 160) to determine the maximum value stored in said storage registers (96); and clock generating means (160, 166) to provide recovered clock signals (RXCLK) at times corresponding to samples providing said maximum value.

The integrated and storage register means (90) includes a plurality of leaky integrators (94) connected to said storage registers, with each storage register having a content.

The peak determining means (150, 152, 160) includes:

a peak value register (150) having a content and also having an input adapted to receive the contents of said storage registers (96) in succession; and a comparator (52) to compare the contents of said peak value register (150) with successive contents of said storage registers (96), and to provide a comparison signal if a storage register content is greater than the value stored in said peak value register (150);

said comparison signal being effective to store the applied storage register content in said peak value register (150).

The local area network station also includes sample counter means (122) to provide sample count output signals identifying s id signal samples; and said clock generating means (160, 166) includes a peak sample number register (160) having a first output adapted to receive said sample count output signals and a second input adapted to receive said comparison signal;

said peak sample number register (160) storing a value representing the sample number at which said maximum value occurred.

The clock generating means includes a logic circuit (166) coupled to an output of said peak sample number register (160) and adapted to receive said sample count output signals; and said clock generating means also has an output (62) on which said recovered clock signal (RXCLK) is provided.

The data symbols mentioned are encoded in a differential phase shift code.

The correlator means (42, 44, 50) includes:
first and second correlators (42, 44) to correlate in-phase and quadrature components of said received signal; and
converter means (50) to convert the output signals of said first and second correlators (42, 44) to amplitude and phase representing signals.

The local area network station includes sample selector means (64, 66, 78) to provide output data signals, said amplitude representing signals being applied in operation to said storage registers (96) and in which said phase representing signals ar applied to said sample selector means (64, 66, 78) to provide output data signals in response to said recovered clock signals (RXCLK).

The sample selector means (64, 66, 78) includes differential phase decoder means (64, 66, 78) to convert said phase representing signals from a differential phase representation to an absolute phase representation.

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. A local area network station for receiving data symbols encoded in a spread spectrum code and transmitted over a wireless channel comprising;
analog-to-digital conversion means to provide a digital representation of a received signal, said received signal being subject to various interference effects;
correlator means coupled to said analog-to-digital conversion means, to provide a plurality of signal samples;
integrator and storage register means including a plurality of storage registers to store integrated representations of said signal samples;
peak determining means to determine the maximum value stored in said storage registers; and
clock generating means to provide recovered clock signals at times corresponding to samples providing said maximum value, said recovered clock signals providing a correctly timed receiver clock wherein said interference effects are minimized.

2. The local area network station as claimed in claim 1, in which said integrator and storage register means includes a plurality of leaky integrators connected to said storage registers, with each storage register having a content.

3. A local area network station for receiving data symbols encoded in a spread spectrum code and transmitted over a wireless channel comprising:
analog-to-digital conversion means to provide a digital representation of a received signal;
correlator means coupled to said analog-to-digital conversion means, to provide a plurality of signal samples;
integrator and storage register means including a plurality of storage registers to store integrated representations of said signal samples;
peak determining means to determine the maximum value stored in said storage registers; and
clock generating means to provide recovered clock signals at times corresponding to samples providing said maximum value;
said integrator and storage register means including a plurality of leaky integrators connected to said storage registers, with each storage register having a content;
said peak determining means including;
a peak value register having a content and also having an input adapted to receive the contents of said storage registers in succession; and
a comparator to compare the contents of said peak value register with successive contents of said storage registers, and to provide a comparison signal if a storage register content is greater than the value stored in said peak value register;
said comparison signal being effective to store the applied storage register content in said peak value register.

4. The local area network station as claimed in claim 3, further including sample counter means to provide sample count output signals identifying said signal samples;
said clock generating means including a peak sample number register having a first output adapted to receive said sample count output signals and a second input adapted to receive said comparison signal;
said peak sample number register storing a value representing the sample number at which said maximum value occurred.

5. The local area network station as claimed in claim 4 in which said clock generating means includes a logic circuit coupled to an output of said peak sample number register and adapted to receive said sample count output signals;
said clock generating means also having an output on which said recovered clock signal is provided.

6. The local area network station as claimed in claim 5 in which said data symbols are encoded in a differential phase shift code and in which said correlator means includes first and second correlators to correlate in-phase and quadrature components of said received signal, and also includes converter mean to convert the output signals of said first and second correlators to amplitude and phase representing signals.

7. The local area network station as claimed in claim 6 further including sample selector means to provide output data signals, said amplitude representing signals being applied in operation to said storage registers and in which said phase representing signals are applied to said sample selector means to provide output data signals in response to said recovered clock signals.

8. The local area network station as claimed in claim 7 in which said sample selector means includes differential phase decoder means to convert said phase representing signals from a differential phase representation to an absolute phase representation.

9. A method of recovering clock signals from a data symbol encoded in a spread spectrum code and transmitted over a wireless channel, including the steps of:
(a) converting a received signal to a digital representation, said received signal being subject to various interference effects;
(b) correlating said digital representation to provide a plurality of signal samples;
(c) integrating said signal samples;

(d) determining the maximum value of the integrated samples; and (e) providing recovered clock signals at times corresponding to samples providing said maximum value, said recovered clock signals providing a correctly timed receiver clock wherein said interference effects are minimized.

10. The method as claimed in claim 9 in which said integrating step is effected through using shift registers and leaky integrators.

* * * * *